United States Patent
Lee et al.

(10) Patent No.: US 9,071,960 B2
(45) Date of Patent: Jun. 30, 2015

(54) REMOTE MANAGEMENT METHOD AND SYSTEM FOR WIRELESS COMMUNICATION TERMINAL

(75) Inventors: Ji-Hye Lee, Suwon-si (KR); Jong-Hyo Lee, Pyeongtaek-si (KR); Sung-Oh Hwang, Yongin-si (KR); Hae-Young Jun, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 582 days.

(21) Appl. No.: 12/639,701

(22) Filed: Dec. 16, 2009

(65) Prior Publication Data

US 2010/0159912 A1   Jun. 24, 2010

(30) Foreign Application Priority Data

Dec. 16, 2008   (KR) .................. 10-2008-0127695

(51) Int. Cl.
*H04W 4/00* (2009.01)
*H04W 8/24* (2009.01)
*H04L 12/18* (2006.01)
*H04L 29/08* (2006.01)
(Continued)

(52) U.S. Cl.
CPC .......... *H04W 8/245* (2013.01); *H04L 12/1859* (2013.01); *H04L 12/189* (2013.01); *H04L 67/125* (2013.01)

(58) Field of Classification Search
CPC ............ H04W 8/245; H04L 29/08072; H04L 41/0213
USPC ............ 455/419; 370/401; 709/203, 207, 223
See application file for complete search history.

(56) References Cited

U.S. PATENT DOCUMENTS

| 2004/0083472 A1* | 4/2004 | Rao et al. ................. 717/171 |
| 2006/0189300 A1 | 8/2006 | Hwang et al. |
| 2006/0193337 A1 | 8/2006 | Paila et al. |

(Continued)

FOREIGN PATENT DOCUMENTS

| CN | 101129021 | 2/2008 |
| CN | 101305534 | 11/2008 |

(Continued)

OTHER PUBLICATIONS

Open Mobile Alliance, Mobile Broadcast Services Architecture, Candidate Version 1.0, OMA-AD-BCAST-V1_0-20081209-C, XP-064032479, Dec. 9, 2008.

(Continued)

*Primary Examiner* — Muthuswamy Manoharan
(74) *Attorney, Agent, or Firm* — The Farrell Law Firm, P.C.

(57) ABSTRACT

A remote management method for a terminal supporting a mobile broadcast service is provided. The terminal receives a service guide with a terminal function management condition from a mobile broadcast service broadcasting server, stores and processes the service guide, and delivers a service subscription request to the mobile broadcast service broadcasting server, receives a message with a Device Management (DM) command generated by a DM server, as the mobile broadcast service broadcasting server receiving the service subscription request sends a request for a DM command regarding a function and a management operation of a terminal to be managed, to the DM server, and stores the DM command and executes the DM command if a status of the terminal satisfies the terminal function management condition.

22 Claims, 6 Drawing Sheets

(51) Int. Cl.
*H04W 40/00* (2009.01)
*G06F 15/16* (2006.01)

(56) References Cited

U.S. PATENT DOCUMENTS

| | | | |
|---|---|---|---|
| 2006/0206716 A1* | 9/2006 | Nagaraj et al. | 713/181 |
| 2007/0015538 A1* | 1/2007 | Wang | 455/558 |
| 2007/0118586 A1 | 5/2007 | Hwang et al. | |
| 2007/0123244 A1* | 5/2007 | Paila | 455/419 |
| 2007/0202874 A1* | 8/2007 | Shon | 455/433 |
| 2007/0220558 A1 | 9/2007 | Jung et al. | |
| 2008/0008176 A1 | 1/2008 | Lim et al. | |
| 2009/0025037 A1* | 1/2009 | Shon | 725/50 |
| 2009/0144771 A1* | 6/2009 | Bangma et al. | 725/39 |

FOREIGN PATENT DOCUMENTS

| | | |
|---|---|---|
| KR | 1020070079927 | 8/2007 |
| WO | WO 2006/115338 | 11/2006 |
| WO | WO 2007/064167 | 6/2007 |
| WO | WO 2007/089123 | 8/2007 |
| WO | WO 2007/100217 | 9/2007 |

OTHER PUBLICATIONS

Open Mobile Alliance, Mobile Broadcast Services Architecture, Draft Version 1.0, OMA-AD-BCAST-V1_0-20050420-D, XP-002439100, Apr. 20, 2005.
European Search Report dated Dec. 4, 2014 issued in counterpart application No. 09833638.1-1857.
Korean Office Action dated Mar. 30, 2015 issued in counterpart application No. 10-2008-0127695.

* cited by examiner

REMOTE MANAGEMENT METHOD AND SYSTEM FOR WIRELESS COMMUNICATION TERMINAL

PRIORITY

This application claims priority under 35 U.S.C. §119(a) to a Korean Patent Application filed in the Korean Intellectual Property Office on Dec. 16, 2008 and assigned Serial No. 10-2008-0127695, the contents of which are incorporated herein by reference.

BACKGROUND OF THE INVENTION

1. Field of the Invention

The present invention relates generally to a management method and system for a wireless communication terminal, and more particularly, to a method and system for remotely managing a wireless communication terminal.

2. Description of the Related Art

A necessity for a standardized method to manage wireless communication devices has developed with the continual increase in the number of wireless communication devices. To meet this need, a Mobile Device Management (MDM) method has been developed, with which wireless operators or service providers can manage Hardware (H/W) functions (e.g., firmware, software, parameter, schedule and capabilities) of each terminal while wirelessly communicating with the terminals. A typical MDM method may include Open Mobile Alliance (OMA) Device Management (DM), as an application standard for wireless communication terminals. OMA DM can manage firmware, software, parameters, and the like in each terminal by reading, adding, deleting, changing and executing objects of a wireless communication terminal using a DM protocol based on Synchronization Markup Language (SyncML). A DM server manages devices such as wireless communication terminals, and the managed devices are considered clients.

The conventional DM method operates on a Peer-to-Peer basis. That is, by creating a one-to-one session between a DM server on the network and a DM client provided in a wireless communication terminal and exchanging messages defined in the DM protocol through the session, the DM server enables the DM client to add/delete/change a particular configuration in the terminal or to perform a particular operation.

The DM protocol is defined by a total of 5 messages: a package #0 to a package #4. A DM session may be formed between a DM server and a device through the DM protocol, and may be initiated by the DM server or by the client, i.e., the device.

FIG. 1 illustrates a conventional DM session setup process.

Referring to FIG. 1, when there is a management operation to perform on a particular device, a DM server 20 informs the device of the existence of a DM action by delivering a package-#0 notification message to the particular device, i.e., a DM client 10 provided in the particular device in step 101. Upon receiving the package-#0 notification message, the DM client 10 makes a request for session setup by sending a package-#1 message to the DM server 20 in step 103. The DM server 20 permits DM session setup, and sends a package-#2 message to the DM client 10 to deliver a DM command for a waiting terminal management operation in step 105. In response to the package-#2 message, the DM client 10 scuds a package 43 message to the DM server 20 to deliver the execution results of the DM command received from the DM server 20 in step 107.

In step 109, the DM server 20 closes the DM session or delivers an additional management operation to the DM client 10 using a package-#4 message, and the DM client 10 performs the additional management operation included in the package-#4 message and reports the results to the MD server 20 using the package #3. Thereafter, the DM server 20 and the DM client 10 may provide management operations or management commands through repetition of the packages 44 and #3. In this case, if a management operation is continuously included in the package-#4 message, the DM session is maintained. However, if there is no additional management operation, the DM session is closed.

In order to take a particular management operation pertaining to the DM client 10, the DM server 20 should know a structure of a DM tree in a wireless communication terminal in which the DM client 10 is installed. The DM tree represents a tree-shaped structure of a Management Object (MO) in the wireless communication terminal, and MO is a means for exposing parameters and objects in the terminal to the DM server 20.

The structure of MO may be defined by an entity such as a service provider and a terminal vendor, and the defined MO structure has an MO IDentifier (ID) that permits identification of its structure. All of MO structures corresponding to MO IDs are registered and managed in a particular server, e.g., an Open Mobile Naming Authority (OMNA), so that an MO structure defined by an entity can be indicated by an MO ID registered in the OMNA. That is, every MO corresponding to one MO ID has the same configuration and structure regardless of the type of the wireless communication terminal.

Among OMA Working Groups, OMA Mobile Broadcast Working Group (BCAST) is specifically, studying a technology standard for providing broadcast services on mobile terminals. OMA BCAST standardizes a service guide, a downloading and streaming technology, a service and content protection technology, and a technology for providing IP-based broadcast services in a mobile terminal environment such as service subscription and roaming.

In line with the trend of the market of providing converged services owing to convergence of the above-described wire/wireless environments, a mobile broadcast technology such as OMA BCAST will also evolve to provide services in the wire/wireless integrated environment beyond the mobile environment.

While a specific example will be described herein below based on an OMA BCAST technology standard, the present invention is not limited to the OMA BCAST technology.

FIG. 2 illustrates a BCAST system of OMA that establishes a standard technology for an application layer and its sub layer or a transport layer regarding a conventional mobile broadcast service, to which the present invention is applied.

Logical entities shown in FIG. 2 will first be described below. A Content Creation (CC) 101 provides contents that are a basis of a BCAST service, and the contents may include common broadcast service files, e.g., movie, audio and video data. The CC 101 provides attributes for the contents, used to generate a service guide and determine a transport bearer over which the service is to be delivered to a BCAST Service Application 102.

The BCAST Service Application 102 receives BCAST service data provided from the Content Creation 101 and processes the received data into a format suitable for media encoding and content protection, and for providing interaction service. The BCAST Service Application 102 provides the attributes for the contents received from the Content Creation 101 to a BCAST Service Distribution/Adaptation 103 and a BCAST Subscription Management 104.

The BCAST Service Distribution/Adaptation 103 performs such operations as file/streaming transmission, service collection, service protection, service guide generation and delivery, and service notification, using the BCAST service data provided from the BCAST Service Application 102. The BCAST Service Distribution/Adaptation 103 also adapts the service to be compatible with a Broadcast Distribution System (BDS) #2 112.

The BCAST Subscription Management 104 manages service provisions such as subscription and charging-related functions of BCAST service users, provisions of information used for the BCAST service, and terminals receiving the BCAST service, on a hardware or software basis.

A Terminal 105 receives contents and a service guide, and information used to support programs such as a content protection program, and provides broadcast services to a user. A BDS Service Distribution #1 111 delivers a mobile broadcast service to a plurality of terminals through mutual communication with the Broadcast Distribution System #2 112 and an Interaction Network 113.

The Broadcast Distribution System #2 112 delivers a mobile broadcast service over a broadcast channel, and an example thereof may include a broadcasting/communication network that is based on Multimedia Broadcast Multicast Service (MBMS) proposed by the $3^{rd}$ Generation Project Partnership (3GPP), BroadCast MultiCast Service (BCMCS) by $3^{rd}$ Generation Project Partnership 2 (3GPP2) which is a $3^{rd}$ generation synchronous mobile communication standard organization, DVB-Handheld (DVB-H) by Digital Video Broadcasting (DVB) which is a digital broadcasting standard organization, or Internet Protocol (IP). The Interaction Network 113 provides an interaction channel, and an example thereof may include a cellular network.

Next, a description will be made of reference points, which are connection paths between the logical entities. The reference points have a plurality of interfaces according to their purpose. Such interfaces are used for communication between two or more logical entities for a predetermined purpose, and a message format and a protocol for the interfaces are applied.

In FIG. 2, BCAST-1 121 is a transmission path for contents and content attributes, and BCAST-2 122 is a transmission path for a Content-protected or Content-unprotected BCAST service, attributes of the BCAST service, and content attributes.

BCAST-3 123 is a transmission path for attributes of the BCAST service, attributes of contents, user preference and subscription information, a user request, and a response to the request. BCAST-4 124 is a transmission path for attributes used for a notification message and a service guide, and keys used for content protection and service protection.

BCAST-5 125 is a transmission path for a Protected BCAST service, an Unprotected BCAST service, a Content-protected BCAST service, a Content-unprotected BCAST service. BCAST service attributes, content attributes, Notification, a service guide a Security material such as Digital Right Management Right Object (DRM RO) and key values used for BCAST service protection, and all data and signals transmitted over a BCAST channel.

BCAST-6 126 is a transmission path for a Protected BCAST service, an Unprotected BCAST service, a Content-protected BCAST service, a Content-unprotected BCAST service. BCAST service attributes, content attributes, Notification, a service guide, a Security material such as DRM RO and key values used for BCAST service protection, and all data and signals transmitted over an Interaction channel.

BCAST-7 127 is a transmission path for service provisioning, Subscription information, and user preference information transmitted over an interaction channel for reception-related control information including a Security material such as DRM RO and key values used for Device Management and BCAST service protection.

BCAST-8 128 is a transmission path over which user data for a BCAST service is interacted. BDS-1 129 is a transmission path for a protected BCAST service, an Unprotected BCAST service, BCAST service attributes, content attributes, notification, a service guide, and a Security material such as DRM RO and key values used for BCAST service protection.

BDS-2 130 is a transmission path for service provisioning, subscription information, and a security material such as DRM RO and key values used for device management and BCAST service protection. X-1 131 is a reference point between the BDS Service Distribution 111 and the Broadcast Distribution System 112. X-2 132 is a reference point between the BDS Service Distribution 111 and the interaction Network 113. X-3 133 is a reference point between the Broadcast Distribution System #2 112 and the Terminal 105. X-4 134 is a reference point between the BDS Service Distribution #1 111 and the Terminal 105 over the broadcast channel. X-5 135 is a reference point between the BDS Service Distribution #1 111 and the Terminal 105 over the interaction channel. X-6 136 is a reference point between the 113 and the Terminal 105.

FIG. 3 illustrates a service guide data model for service guide generation in an OMA BCAST system, or a mobile broadcast system, to which the present invention is applied. This structure has been proposed to provide a broadcast service from a BCAST system to a terminal. One service guide consists of fragments having their own purposes, and the respective fragments are divided into 4 groups according to their uses. In FIG. 3, a solid line connecting one fragment to another fragment indicates a cross reference between the fragments.

As shown in FIG. 3, a service guide data model consists of an Administrative group 200 that provides upper configuration information of the entire service guide, a Core group 220, which is a core part of the service guide, including Service, Content and Schedule, an Access group 230 that provides access information for enabling access to a service or a content, and a Provisioning group 210 that includes subscription and purchase information.

Regarding components of each group, the Administrative group 200 includes. ServiceGuideDeliveryDescriptor 201, and the Provisioning group 210 includes PurchaseItem 211, PurchaseData 212, and PurchaseChannel 213. The Core group 220 includes Service 221, Schedule 222, and Content 223, and the Access group 230 includes Access 231 and SessionDescription 232.

In addition to the above 4 groups, the service guide information includes PreviewData 241 and InteractivityData 251 as shown in FIG. 3. The above-mentioned components are called fragments, which are minimum units constituting, a Service Guide (SG).

The ServiceGuideDeliveryDescriptor fragment 201 indicates information about a delivery session in which a ServiceGuideDeliveryUnit (SGDU) containing fragments constituting the service guide is located, and indicates an entry point for receiving grouping information about the SGDU and a notification message.

The Service fragment 221 is an upper aggregate of contents that are included, in a broadcast service as the core of the entire service guide, and includes content, genre and service area information of the service. The Schedule 222 indicates time information of each of contents included in the service, such as Streaming and Downloading.

The Content fragment 223 includes such information as a detailed description, a target user group, a service area, and a genre of the content being broadcasted.

The Access fragment 231 provides access-related information to enable a user to view the service, and provides a delivery method and session information for the associated access session.

The SessionDescription fragment 232 may be included in the Access fragment 231, and provides location information in the URI form so that the terminal may check information about the SessionDescription fragment 232. The SessionDescription fragment 232 provides address information and codec information for multimedia contents existing in the associated session.

The PurchaseItem fragment 211 helps the user subscribe to or purchase the PurchaseItem fragment 211 by providing service bundles of such factors as content and time.

The PurchaseData fragment 212 includes detailed purchase and subscription information such as price information, promotion information and the like about services or service bundles.

The PurchaseChannel fragment 213 provides access information for subscription or purchase. The ServiceGuideDeliveryDescriptor fragment 201 provides information about an entry point for receiving the service guide, and grouping information for an SGDU that is a container of the fragment.

The PreviewData fragment 241 may be used to provide Preview information for service, schedule and content, or the InteractivityData fragment 251 may be used to provide an interactive service according to the associated service, schedule and content during broadcasting. The detailed information about the service guide can be defined using various elements and attributes for providing detailed contents and values, based on the upper data model in FIG. 3.

While detailed elements and attributes for each fragment of the service guide are not considered in this specification for the sake of conciseness, the detailed elements and attributes do not limit the scope of the present invention described below, and the present invention may be applied to all of the elements and attributes that are defined in providing a service guide for a mobile broadcast service as needed.

As described above, since the conventional device management is achieved between the DM server and the wireless communication terminal on a pear-to-pear basis, it is virtually impossible to restrict terminal functions according to the policy established by the BCAST service provider. Therefore, there is a need for a method capable of controlling terminal functions by delivering the same DM command to a plurality of wireless communication terminals simultaneously according to a policy established by a service provider.

SUMMARY OF THE INVENTION

An aspect of the present invention is to address at least the above-mentioned problems and/or disadvantages and to provide at least the advantages described below. Accordingly, an aspect of the present invention provides a method and system capable of simply delivering the same DM command to a plurality of wireless communication terminals according to a policy established by a service provider.

An aspect of the present invention provides a method and system for enabling interaction between a BCAST server and a DM server for generation and execution of a DM command.

An aspect of the present invention provides a method and system capable of reducing consumption of wireless resources in delivering the same DM command to a plurality of wireless communication terminals.

An aspect of the present invention provides a method and system capable of delivering the same DM action to a plurality of wireless communication terminals using a broadcasting transport.

An aspect of the present invention provides a method and system capable of adding information about restrictions of a service, such as a service area and a condition, to service information provided from a BCAST Subscription Management to BCAST Service Distribution/Adaptation.

An aspect of the present invention provides a process of delivering a DM command request message with service subscription information of a terminal to a DM server by a BCAST Subscription Management.

An aspect of the present invention provides a process of delivering a DM command message to a terminal by a DM server.

An aspect of the present invention provides a process of adding a DM command for a relevant terminal in a response message to a BCAST service subscription request.

In accordance with the present invention, there is provided a remote management apparatus for a terminal supporting a mobile broadcast service, in which a broadcast service processing module receives and processes mobile broadcast data, receives a service guide with a terminal function management condition from a mobile broadcast service broadcasting server, stores and processes the service guide, and delivers a service subscription request to the mobile broadcast service broadcasting server, and a DM client receives a message with a DM command generated by a DM server, stores the DM command, and then executes the DM command if a status of the terminal satisfies the terminal function management condition, as the mobile broadcast service broadcasting server receiving the service subscription request sends a request for a DM command regarding a function and a management operation of a terminal to be managed, to the DM server.

In accordance with the present invention, there is provided a remote management method for a terminal supporting a mobile broadcast service, in which a service guide with a terminal function management condition is received from a mobile broadcast service broadcasting server; the service guide is stored and processed, and a service subscription request is delivered to the mobile broadcast service broadcasting server, a message with a DM command generated by a DM server is received, as the mobile broadcast service broadcasting server receiving the service subscription request sends a request for a DM command regarding a function and a management operation of a terminal to be managed, to the DM server, and the DM command is stored, and the DM command is executed if a status of the terminal satisfies the terminal function management condition.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EMBODIMENTS OF THE INVENTION

Figure 1:
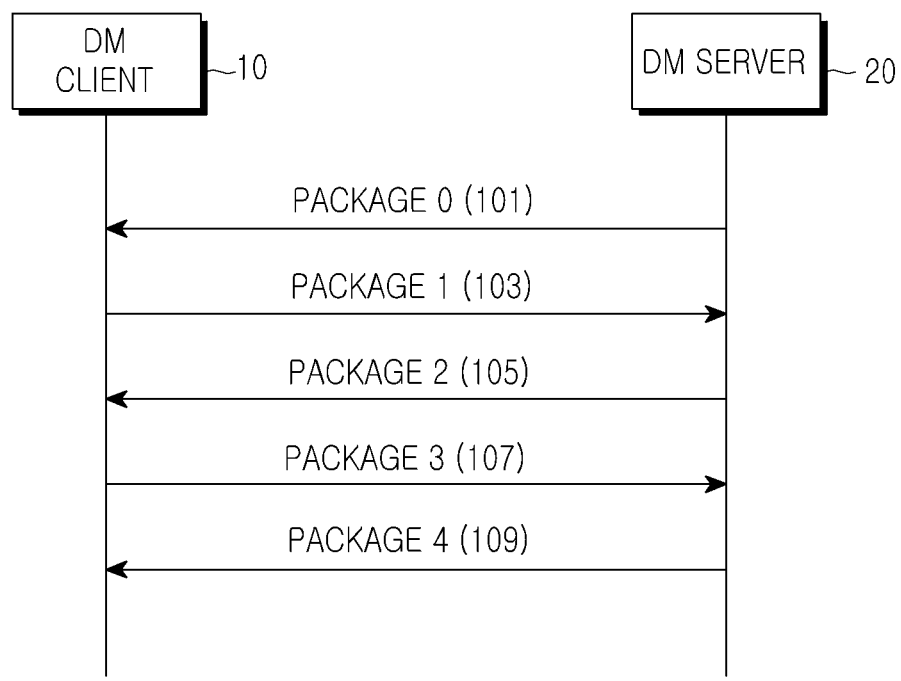
FIG. 1 illustrates a conventional DM protocol.
Figure 2:
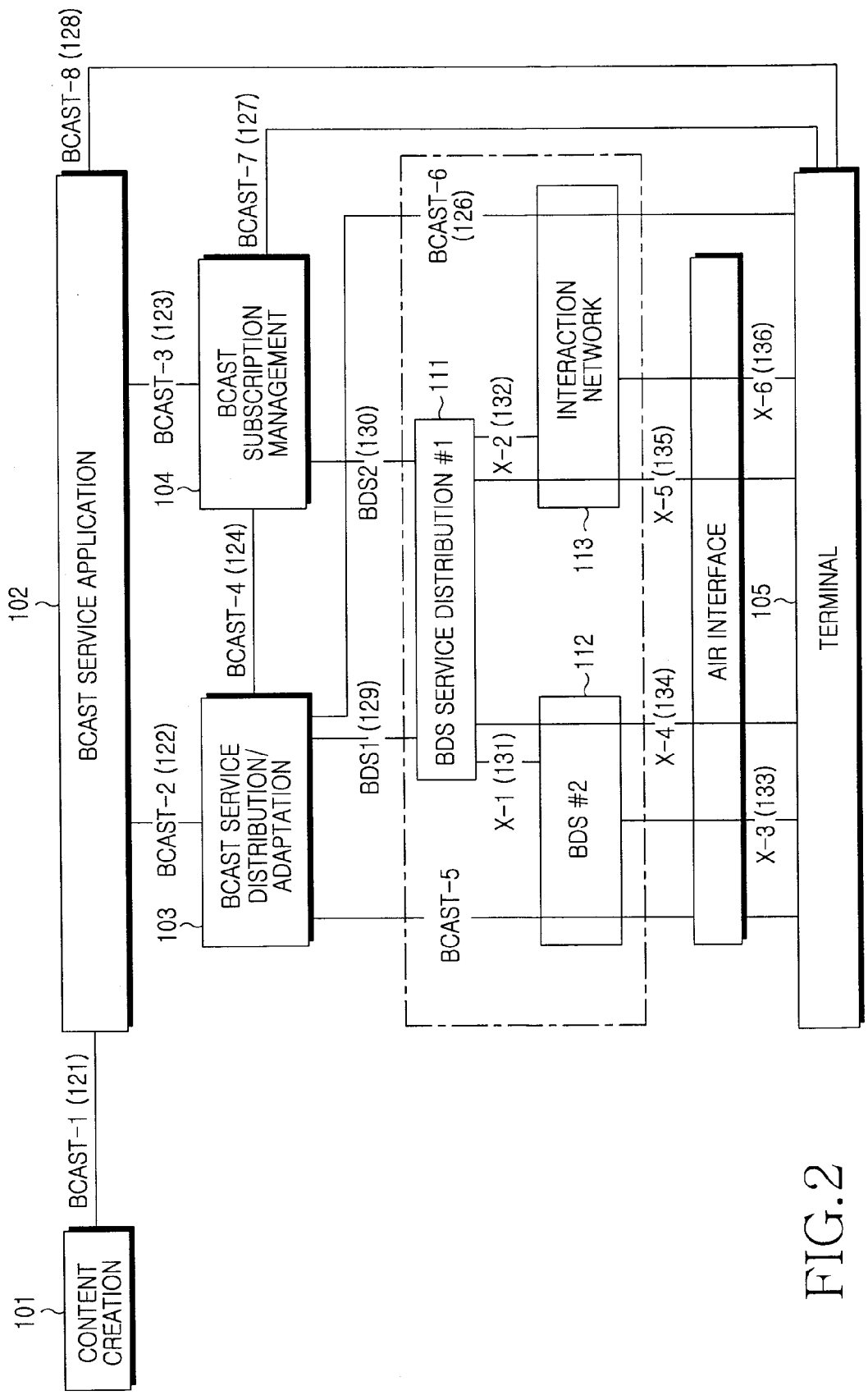
FIG. 2 illustrates a conventional BCAST system.
Figure 3:
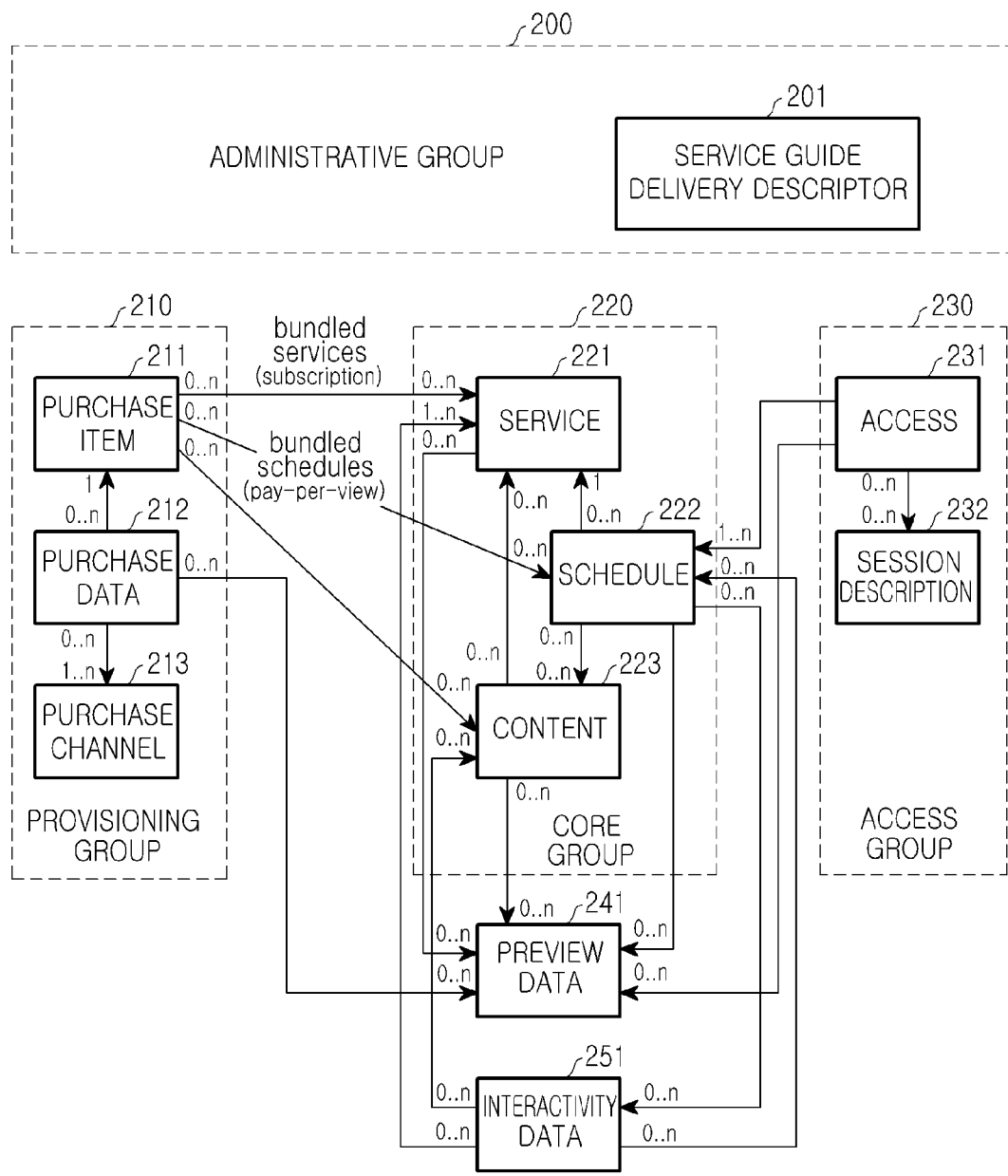
FIG. 3 illustrates a conventional BCAST service guide data model.

Reference will now be made in detail to embodiments of the present invention with reference to the accompanying drawings. Throughout the drawings, the same drawing reference numerals will be understood to refer to the same elements, features and structures. In addition, descriptions of well-known functions and constructions are omitted for the sake of clarity and conciseness.

A wireless communication terminal offers a user a variety of communication services provided by the communication system, for example, voice and video call services, messaging services, and wireless data services. The wireless communication terminal includes various functions related to every type of communication service, and also includes a variety of additional functions, such as phonebook, alarm, game, music playing, and schedule management functions.

Specific conditions of the above-stated communication services and functions are subject to change. For example, a user can set restriction of various types of incoming/outgoing calls and restriction of access to user data, and details associated with communication services, such as call transfer service, automatic answering, call/message alert mode and call alert tone. In addition, the user can freely change specific conditions of the additional functions, such as display setting, phonebook setting, alarm setting and scheduler setting. In the following description, these changeable setting conditions regarding the variety of communication services and functions provided by the wireless communication terminal are referred to as configuration parameters.

In accordance with the present invention, a DM server sends a DM message to a plurality of wireless communication terminals on a one-to-many transport basis, and a DM client in a wireless communication terminal receiving the DM message analyzes the received DM message and properly responds thereto. However, since DM trees in the multiple wireless communication terminals may have a different structure from each other, the DM message being sent to these terminals may not designate a complete Uniform Resource Identifier (URI) of a particular node unlike the conventional DM message.

In other words, the present invention provides a method, in which after a broadcasting server broadcasted information about restrictions (e.g., areas and conditions) for a particular service, if a plurality of terminals have subscribed to the service, the broadcasting server informs a DM server of the service subscription by the terminals, requests generation of a DM command to manage functions of the terminals, and delivers the DM command to the terminals.

Further, the present invention provides a method in which multiple wireless communication terminals may execute the same DM action even though they satisfy the above terminal function management condition at different timings.

Meanwhile, a Management Object (MO), which is a gathering of nodes performing a particular function, has its own unique MO ID. That is, a Software Component Management Object (SCOMO) for performing software component management has a unique MO ID, and regardless of where on a DM tree of a wireless communication terminal the MO is located, the MO ID is maintained constant, and types and connections of sub-nodes constituting the MO are unchanged. Therefore, even for the wireless communication terminals having different DM tree structures, since the MO indicated by each MO ID is identical and the wireless communication terminals know their own DM tree structures, the terminals can determine where a root node of the MO indicated by a particular MO ID is located.

For a better understanding of the present invention, reference will be made to FIGS. 4 to 6 in which multiple wireless communication terminals are considered BCAST terminals. While the wireless communication terminals will be assumed to be BCAST terminals in described embodiments of the present invention, the present invention may be applied in a similar manner to terminals supporting other types of mobile broadcast services, or terminals supporting voice and video call services.

Figure 4:
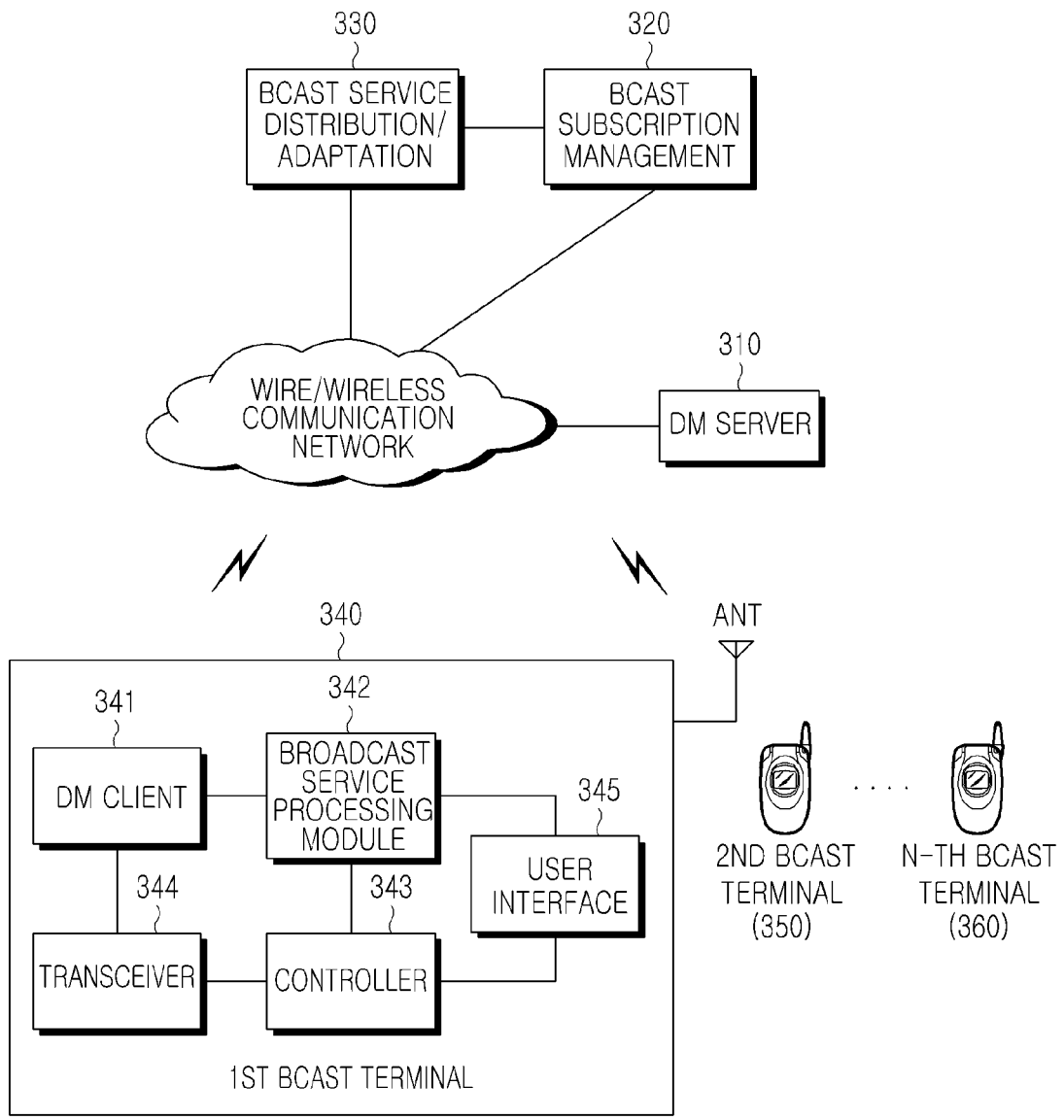
FIG. 4 illustrates a DM system to which the present invention is applied.

FIG. 4 illustrates a remote management system for wireless communication terminals, to which the present invention is applied. As shown in FIG. 4, the remote management system includes a DM server 310, a BCAST Subscription Management 320, a BCAST Service Distribution/Adaptation 330, and a plurality of BCAST terminals 340, 350 and 360.

The DM server 310, the BCAST Subscription Management 320 and the BCAST Service Distribution/Adaptation 330 operate similarly to the previously described DM server 20, the BCAST Subscription Management 104, and the BCAST Service Distribution/Adaptation 103, respectively. These entities perform the following operations according to the present invention.

Each of the BCAST terminals 340, 350 and 360 is a terminal supporting a BCAST service. The $1^{st}$ BCAST terminal 340 includes a DM client 341, a broadcast service processing module 342 for performing reception processing on broadcast data generated by the BCAST service, a controller 343 for controlling the overall operation of the BCAST terminal 340 and operations related to various functions provided in the BCAST terminal 340, a transceiver 344, and a user interface 345.

The DM client 341 operates similarly to the DM client 10 described in FIG. 1, and performs a DM operation described below in association with the broadcast service processing module 342 and the controller 343 according to the present invention. The broadcast service processing module 342 performs reception processing on a broadcast signal created by the BCAST service, and delivers a received broadcast signal to the DM client 341 if the received broadcast signal includes DM-related data. The controller 343 exchanges data with the wire/wireless communication network using the transceiver 344, and transmits/receives and processes a variety of messages and information. In an embodiment of the present invention, the controller 343 may generate a BCAST service subscription request message and send it to the BCAST Subscription Management 320. In another embodiment of the present invention, the BCAST service subscription request message may be generated by the broadcast service processing module 342. The user interface 345 includes an input device such as a keypad, and an output device such as a display.

While only the first BCAST terminal 340 will be considered in the following description, the present invention may be applied in a similar manner to the $2^{nd}$ and Nth BCAST terminals 350 and 360 as well.

A terminal function management method based on terminal function restriction disclosed in the present invention will be described with reference to FIG. 5, which illustrates a remote management process according to a first embodiment of the present invention.

In order to manage a certain function of a terminal, the BCAST Service Distribution/Adaptation 330 adds a terminal function management condition for managing the function of the terminal that a service provider designated in a Service fragment or a Content fragment, when the BCAST Service Distribution/Adaptation 330 generates a service guide in step 401. The terminal function management condition is defined to perform a management operation determined by a DM command for the function of the terminal according to a status of the terminal. That is, if the status of the terminal satisfies the terminal function management condition, a management operation for the function is performed.

An example of the terminal function management may include restricting a certain function. For example, the terminal function management may restrict audio output. As one value of the terminal function management condition, an area where the terminal is located may be considered, and a service provider may further add a condition based on the area. For example, the terminal function management condition may be a particular time or period, or may be a such information as a wireless signal reception rate or a battery capacity of a BCAST terminal.

The terminal function management condition may be added in the following Service fragment or Content fragment. An example of the Service fragment is shown in Table 1, and an example of the Content fragment is shown in Table 2. Referring to Tables 1 and 2, a "DMFilter" item is added in the Service fragment and the Content fragment to include the terminal function management condition. "DMFilter" stores a value for triggering a DM command to control a function of a terminal. A value of "DMFilter" can be, for example, a value for performing filtering so that when a terminal moves to a particular area, a management operation for a particular function may be performed. The terminal function management condition may also include a type of a terminal function to be controlled. It is assumed in FIG. 4 that more than one terminal is designated, including the first BCAST terminal 340.

For reference, in message schema in the following Tables 1 to 4, "Name" indicates names of elements and attributes constituting a related message.

"Type" indicates whether a type of a certain name is an element or an attribute. An element has values such as E1, E2, E3 and E4, in which E1 indicates an upper element for the entire message, E2 indicates a sub-element of E1, E3 indicates a sub-element of E2, and E4 indicates a sub-element of E3. An attribute is represented by A, which indicates an attribute of a relevant element. For example, A under E1 indicates an attribute of E1.

"Category" is used to determine whether a certain element or attribute is Mandatory (M) or Optional (O). An M value is given for a mandatory element or attribute, and an O value is given for an optional element or attribute. "Cardinality" indicates a relationship between elements, and has values of 0, 0 . . . 1, 1, 0 . . . n, 1 . . . n. Here, 0 indicates an optional relationship, 1 indicates a mandatory relationship, and n indicates a possibility of having multiple values. For example, 0 . . . n indicates that a related element may not exist, or may have n values.

"Description" indicates a meaning of a relevant element or attribute, and "Data Type" indicates a data type of the relevant element or attribute.

TABLE 1

| Name | Type | Category | Cardinality | Description | Data Type |
|---|---|---|---|---|---|
| Service | E | | | 'Service' fragment<br>Contains the following attributes:<br>idversionvalidFromvalidTo<br>globalServiceID<br>weightbaseCID<br>emergency<br>Contains the following elements:<br>ProtectionKeyID<br>ServiceType<br>Name<br>Description<br>AudioLanguage<br>TextLanguage<br>ParentalRating<br>TargetUserProfile<br>Genre<br>Extension<br>PreviewDataReference<br>BroadcastArea<br>TermsOfUse<br>PrivateExt | |
| id | A | NM/TM | 1 | ID of the 'Service' fragment. The value of this attribute SHALL be globally unique." | anyURI |
| version | A | NM/TM | 1 | Version of this fragment. The newer version overrides the older one starting from the time specified by the 'validFrom' attribute, or as soon as it has been received if no 'validFrom' attribute is given.<br>omitted | unsignedInt |
| BroadcastArea | E1 | NO/TO | 0 . . . 1 | Broadcast area to include location information for BCAST contents.<br>Contains the following attribute:<br>polarity<br>Contains the following elements:<br>TargetArea<br>hor_acc<br>DMFilter | |

TABLE 1-continued

| Name | Type | Category | Cardinality | Description | Data Type |
|---|---|---|---|---|---|
| polarity | A | NO/TO | 0...1 | Indication of whether the associated target area is intended for positive or negative terminal reception of the service.<br>If polarity = true, this indicates the associated service is intended for reception by terminals located within the corresponding geographical area. (Default)<br>If polarity = false, this indicates the associated service is not intended for reception by terminals located within the corresponding geographical area. | boolean |
| TargetArea | E2 | NO/TM | 0...N | The target area to distribute contents (as specified in the [OMA MLP] with modifications)<br>Contains the following elements:<br>shape<br>cc<br>name_area<br>ZipCode<br>CellTargetArea | |
| shape | E3 | NO/TM | 0...1 | Shapes used to represent a geographic area that describes (as specified in the [OMA MLP]) | |
| cc | E3 | NO/TM | 0...1 | Country code, 1-3 digits e.g. 355 for Albania (as specified in the [OMA MLP]) | unsignedShort |
| name_area | E3O | N/TM | 0...N | Geopolitical name of area such as 'Seoul' (as specified in the [OMA MLP]. The instances of 'name_area' element differ only in language. The language is expressed using built-in XML attribute 'xml:lang' with this element. | string |
| ZipCode | E3 | NO/TM | 0...1 | Zip code | string |
| CellTargetArea | E3 | NO/TM | 0...1 | The target area to distribute content specified by the BDS specific service coverage area or minimum transmit area<br>Contains the following attribute:<br>type<br>Contains the following element:<br>CellArea | |
| type | A | NM/TM | 1 | Allowed values are:<br>0 - Unspecified<br>1 - 3GPP Cell Global Identifier as defined in 3GPP TS 23.003<br>2 - 3GPP Routing Area Identifier (RAI) as defined in 3GPP TS 23.003<br>3 - 3GPP Location Area Identifier (LAI) as defined in 3GPP TS 23.003<br>4 - 3GPP Service Area Identifier (SAI) as defined in 3GPP TS 23.003<br>5 - 3GPP MBMS Service Area Identity (MBMS SAI) as defined in 3GPP TS 23.003<br>6 - 3GPP2 Subnet ID as defined in [3GPP2 C.S0054-0]<br>7 - 3GPP2 SID as defined in [3GPP2 C.S0005-D]<br>8 - 3GPP2 SID + NID as defined in [3GPP2 C.S0005-D]<br>9 - 3GPP2 SID + NID + PZID as defined in [3GPP2 C.S0005-D]<br>10 - 3GPP2 SID + PZID as defined in [3GPP2 C.S0005-D]<br>11 - DVB-H Cell ID (specified in section 6.3.4.1 of [BCAST10-DVBH-IPDC-Adaptation])<br>12 - 127 reserved for future use<br>128-255 reserved for proprietary use | unsignedByte |
| CellArea | E4 | NO/TM | 0...N | The BDS specific transmit area given in the format as defined by type.<br>Contains the following attribute:<br>value<br>Contains the following element:<br>PP2CellID | |
| value | A | NM/TM | 1 | The value of the cell ID depending on the value of the type attribute | unsignedShort |
| PP2CellID | E5 | NO/TO | 0...N | If type = 4, the value is Sector_ID as defined in [3GPP2 C.S0024-A]<br>If type = 5, 6, 7 or 8.<br>the value is BASE ID as defined in [3GPP2C.S0002-0]<br>3GPP2 terminals SHALL support this element. | positive Integer |

TABLE 1-continued

| Name | Type | Category | Cardinality | Description | Data Type |
|---|---|---|---|---|---|
| hor_acc | E2 | NO/TM | 0...N | Horizontal accuracy in meters (as specified in the [OMA MLP]) | string |
| DMFilter | E2 | NO/TM | 0...N | Filter values for triggering DM commands for controlling Terminal Capabilities. omitted | |
| PrivateExt | E1 | NO/TO | 0...1 | An element serving as a container for proprietary or application-specific extensions. | |
| <proprietary elements> | E2 | NO/TO | 0...N | Proprietary or application-specific elements that are not defined in this specification. These elements may further contain sub-elements or attributes. | |

TABLE 2

| Name | Type | Category | Cardinality | Description | Data Type |
|---|---|---|---|---|---|
| Content | E | | | 'Content' fragment<br>Contains the following attributes:<br>idversionvalidFromvalidTo<br>globalContentID<br>emergency<br>baseCID<br>Contains the following elements:<br>ServiceReference<br>ProtectionKeyID<br>Name<br>Description<br>StartTimeEndTimeAudioLanguage<br>TextLanguage<br>Length<br>ParentalRating<br>TargetUserProfile<br>Genre<br>Extension<br>PreviewDataReference<br>BroadcastArea<br>TermsOfUse<br>PrivateExt | |
| id | A | NM/TM | 1 | ID of the 'Content' fragment. The value of this attribute SHALL be globally unique. | anyURI |
| version | A | NM/TM | 1 | Version of this fragment. The newer version overrides the older one starting from the time specified by the 'validFrom' attribute, or as soon as it has been received if no 'validFrom' attribute is given.<br>omitted | unsignedInt |
| BroadcastArea | E1 | NO/TO | 0...1 | Broadcast area to include location information for BCAST contents<br>Contains the following attribute:<br>polarity<br>Contains the following elements:<br>TargetArea<br>hor_acc<br>DMFilter | |
| polarity | A | NO/TO | 0...1 | Indication of whether the associated target area is intended for positive or negative terminal reception of the content item.<br>If polarity = true, this indicates the associated content item is intended for reception by terminals located within the corresponding geographical area. (Default)<br>If polarity = false, this indicates the associated content item is not intended for reception by terminals located within the corresponding geographical area. | boolean |
| TargetArea | E2 | NO/TM | 0...N | The target area to distribute contents (as specified in the [OMA MLP] with modifications)<br>Contains the following elements:<br>shape<br>cc<br>name_area<br>ZipCode<br>CellTargetArea | |

TABLE 2-continued

| Name | Type | Category | Cardinality | Description | Data Type |
|---|---|---|---|---|---|
| shape | E3 | NO/TM | 0 . . . 1 | Shapes used to represent a geographic area that describes (as specified in the [OMA MLP]) | |
| cc | E3 | NO/TM | 0 . . . 1 | Country code, 1-3 digits e.g. 355 for Albania (as specified in the [OMA MLP]) | unsignedShort |
| name_area | E3 | NO/TM | 0 . . . N | Geopolitical name of area such as 'Seoul' (as specified in the [OMA MLP]). The instances of 'name_area' element differ only in language. The language is expressed using built-in XML attribute 'xml:lang' with this element. | string |
| ZipCode | E3 | NO/TM | 0 . . . 1 | Zip code | string |
| CellTargetArea | E3 | NO/TM | 0 . . . 1 | The target area to distribute content specified by the BDS specific service coverage area or minimum transmit area<br>Contains the following attribute:<br>type<br>Contains the following element:<br>CellArea | |
| type | A | NM/TM | 1 | Allowed values are:<br>0 - Unspecified<br>1 - 3GPP Cell Global Identifier as defined in 3GPP TS 23.003<br>2 - 3GPP Routing Area Identifier (RAI) as defined in 3GPP TS 23.0033 3GPP Location Area Identifier (LAI) as defined in 3GPP TS 23.003<br>4 - 3GPP Service Area Identifier (SAI) as defined in 3GPP TS 23.003<br>5 - 3GPP MBMS Service Area Identity (MBMS SAI) as defined in 3GPP TS 23.003<br>6 - 3GPP2 Subnet ID as defined in [3GPP2 C.S0054-0]<br>7 - 3GPP2 SID as defined in [3GPP2 C.S0005-D]<br>8 - 3GPP2 SID + NID as defined in [3GPP2 C.S0005-D]<br>9 - 3GPP2 SID + NID + PZID as defined in [3GPP2 C.S0005-D]<br>10 - 3GPP2 SID + PZID as defined in [3GPP2 C.S0005-D]<br>11 - DVB-H Cell ID (specified in section 6.3.4.1 of [BCAST10-DVBH-IPDC-Adaptation])<br>10-127 reserved for future use<br>128-255 reserved for proprietary use | unsignedByte |
| CellArea | E4 | NO/TM | 0 . . . N | The BDS specific transmit area given in the format as defined by type.<br>Contains the following attribute:<br>Value<br>Contains the following element:<br>PP2CellID | |
| value | A | NM/TM | 1 | The value of the cell ID depending on the value of the type attribute. | unsignedShort |
| PP2CellID | E5 | NO/TO | 0 . . . N | If type = 4, the value is Sector_ID as defined in [3GPP2 C.S0024-A]<br>If type = 5, 6, 7 or 8, the value is BASE ID as defined in [3GPP2 C.S0002-0]<br>Note: See relevant BDS specification for the data type of this element<br>Note: 3GPP2 terminals SHALL support this element | positive Integer |
| hor_acc | E2 | NO/TM | 0 . . . N | Horizontal accuracy in meters (as specified in the [OMA MLP]) | string |
| DMFilter | E2 | NO/TM | 0 . . . N | FilterValues for triggering DM commands for controlling Terminal Capabilities.<br>omitted | |
| PrivateExt | E1 | NO/TO | 0 . . . 1 | An element serving as a container for proprietary or application-specific extensions. | |
| <proprietary elements> | E2 | NO/TO | 0 . . . N | Proprietary or application-specific elements that are not defined in this specification. These elements may further contain sub-elements or attributes. | |

The BCAST Service Distribution/Adaptation 330 delivers the service guide generated in step 401 to the first BCAST terminal 340 in step 403. In step 405, the first BCAST terminal 340 receives the service guide and then stores and processes the received service guide. If the first BCAST terminal 340 sends a service subscription request message to the BCAST Subscription Management 320 for the service subscription in step 407, the BCAST Subscription Management 320 authenticates and authorizes the first BCAST terminal 340 in step 409, and sends a service subscription response message to the first BCAST terminal 340 in step 411, completing the service subscription.

In step 413, the BCAST Subscription Management 320 sends a request to generate a DM command corresponding to the terminal function and management operation to be controlled, to the DM server 310, the DM command including BCAST service subscription information for one or more terminals that have subscribed to the service. For example, the BCAST Subscription Management 320 may request generation of a DM command to restrict a particular function of the terminal. Otherwise, the BCAST Subscription Management 320 may request generation of a DM command pertaining to software update or firmware update for a certain terminal function.

Steps 415a, 415b and 415c represent three different methods in which the DM server 310 can deliver the generated DM command to the first BCAST terminal 340 according to the present invention.

In the first method (step 415a), the DM server 310 may deliver the DM command to each of multiple terminals, i.e., the first BCAST terminal 340, on a one-to-one basis in step 415a-1.

In the second method (step 415b), in order to deliver the DM command to multiple terminals simultaneously, the DM server 310 delivers the DM command to the BCAST Subscription Management 320 in step 415b-1 and the BCAST Subscription Management 320 reformats the DM command into a BCAST message and delivers the BCAST message to the multiple terminals, including the first BCAST terminal 340 in step 415b-2. The BCAST message that can be used to carry the DM command may be configured using a given method such as OMA Push and BCAST Notification. That is, a DM message having a DM command, can be configured in the form of a BCAST message, and the DM message may include information for identifying a terminal function management condition associated with the DM command included therein.

Table 3 below shows a BCAST message that uses BCAST Notification for an embodiment of the present invention. Table 3 shows terminal function management operations for when the terminal function is set as restriction and for when the terminal function management condition is a particular location.

TABLE 3

| Name | Type | Category | Cardinality | Description | Data Type |
|------|------|----------|-------------|-------------|-----------|
| Notification Message | E | | | Notification Message Contains the following attributes: id version notificationType eventType validTo Contains the following elements: IDRef Title Description PresentationType Extension SessionInformation MediaInformation SGDD SGDDReference FragmentID AuxDataTrigger DMCommand PrivateExt Omitted | |
| SessionInformation | E1 | NM/TM | 0 . . . N | This element SHALL be present when the Notification Message carries pointer to another delivery session, for example for file download or update, SG download or update, or auxiliary data download. SessionInformation defines the delivery session information, transport object identifiers of the objects delivered through the indicated session, and URI as alternative method for delivery over interaction channel. After receiving Notification Message with SessionInformation, Terminal would access the relevant session specified by SessionInformation and take a proper action like receiving contents. Contains the following attributes: validFrom validTo usageType Contains the following elements: DeliverySession AlternativeURI Relatively long-lived auxiliary data associated with this Notification | |

TABLE 3-continued

| Name | Type | Category | Cardinality | Description | Data Type |
|---|---|---|---|---|---|
| | | | | Message SHOULD be scheduled for distribution using the Service Guide. On the other hand, dynamic updates of auxiliary data MAY be delivered on the delivery session referenced by this SessionInformation. | |
| validFrom | A | NM/TM | 0 . . . 1 | The first moment when the session for terminal to receive data is valid. This field expressed as the first 32 bits integer part of NTP time stamps. | unsignedInt |
| validTo | A | NM/TM | 0 . . . 1 | The last moment when the session for terminal to receive data is valid. This field expressed as the first 32 bits integer part of NTP time stamps. | unsignedInt |
| usageType | A | NM/TM | 0 . . . 1 | Defines the type of the object transmitted through the indicated delivery session. Allowed values are:<br>0 - unspecified<br>1 - files<br>2 - streams<br>3 - SGDD only<br>4 - mixed SGDD and SGDU<br>5 - notification<br>6 - DM command<br>7-127 reserved for future use<br>128-255 reserved for proprietary use<br>Note: the delivery session only carrying SGDUs is declared through 'SGDD' element or "SGDDReference"element in this Notification Message.<br>Default: 0 | unsignedByte |
| DeliverySession | E2 | NM/TM | 0 . . . 1 | Target delivery session information indicated by the Notification Message. Contains the following attributes:<br>ipAddress<br>port<br>sourceIP<br>transmissionSessionID<br>Contains the following element:<br>TransportObjectID | |
| ipAddress | A | NM/TM | 1 | Destination IP address of the target delivery session | string |
| port | A | NM/TM | 1 | Destination port of target delivery session | unsignedShort |
| sourceIP | A | NM/TM | 0 . . . 1 | Source IP address of the delivery session | string |
| transmissionSessionID | A | NM/TM | 1 | This is the Transmission Session Identifier (TSI) of the session at ALC/LCT level. | unsignedShort |
| TransportObjectID | E3 | NM/TM | 0 . . . N | The transport object ID (TOI) of the object transmitted through the indicated delivery session | positive Integer |
| AlternativeURI | E2 | NM/TM | 0 . . . 1 | Alternative URI for receiving the object via the interaction channel. If terminal cannot access the indicated delivery session, the terminal can receive the objects associated with the Notification Message by AlternativeURI. omitted | anyURI |
| DMCommand | E1 | NO/TM | 0 . . . 1 | DM command message for use with location based capability restriction | |
| Command | E2 | NM/TM | 1 | DM command message. | complexType |
| PrivateExt | E1 | NO/TO | 0 . . . 1 | An element serving as a container for proprietary or application-specific extensions. | |
| <proprietary elements> | E2 | NO/TO | 0 . . . N | Proprietary or application-specific elements that are not defined in this specification. These elements may further contain sub-elements or attributes. | |

Referring to Table 3, the items newly added to include the DM command are "DMCommand" and "Command". "DMCommand" includes the associated terminal function management condition information, and "command" includes an actual DM command.

In a third method (step 415c), in order to simultaneously deliver the DM command to multiple terminals that use different BCAST bearers, the DM server 310 delivers the DM command to the BCAST Subscription Management 320 in step 415c-1, and the BCAST Subscription Management 320 reformats the DM command into a BCAST message and delivers the BCAST message to the BCAST Service Distribution/Adaptation 330 in step 415c-2. The BCAST message that can be used to carry the DM command may be configured using a certain method such as OMA Push and BCAST Notification, as in the second method (step 415b). Thereafter, in step 415c-3, the BCAST Service Distribution/Adaptation 330 adapts the DM command to each BCAST bearer, includes the first BCAST terminal 340 in it, and delivers the resulting DM message to the multiple subscribed terminals in steps 415c-3.

The first BCAST terminal 340 receives a message with a DM command in any one of the three methods. If a triggering event satisfying a terminal function management condition designated by the service provider during service subscription occurs after a lapse of a predetermined time, or if a status of the first BCAST terminal 340 satisfies the terminal function management condition, the DM client 341 in the first BCAST terminal 340 may execute the received DM command in step 417. The occurrence of the triggering event or the satisfaction of the terminal function management condition may be sensed by the DM client 341, or by the DM client 341 and the controller 343 in cooperation.

For example, if a particular location (area) is set as a terminal function management condition in the first BCAST terminal 340 and a DM command corresponding to the terminal function management condition is a certain function, e.g., reception restriction of mobile broadcast, then the first BCAST terminal 340 restricts the certain function, e.g., mobile broadcast reception, when the first BCAST terminal 340 is located in the particular area. Also, the first BCAST terminal 340 may execute a DM command to restrict a camera function in the particular location for security reasons.

Accordingly, even though multiple BCAST terminals satisfy the terminal function management condition at different timings, the terminals can execute the same DM action.

Thereafter, the BCAST Service Distribution/Adaptation 330 provides the service to the BCAST terminal in step 419.

Figure 6:
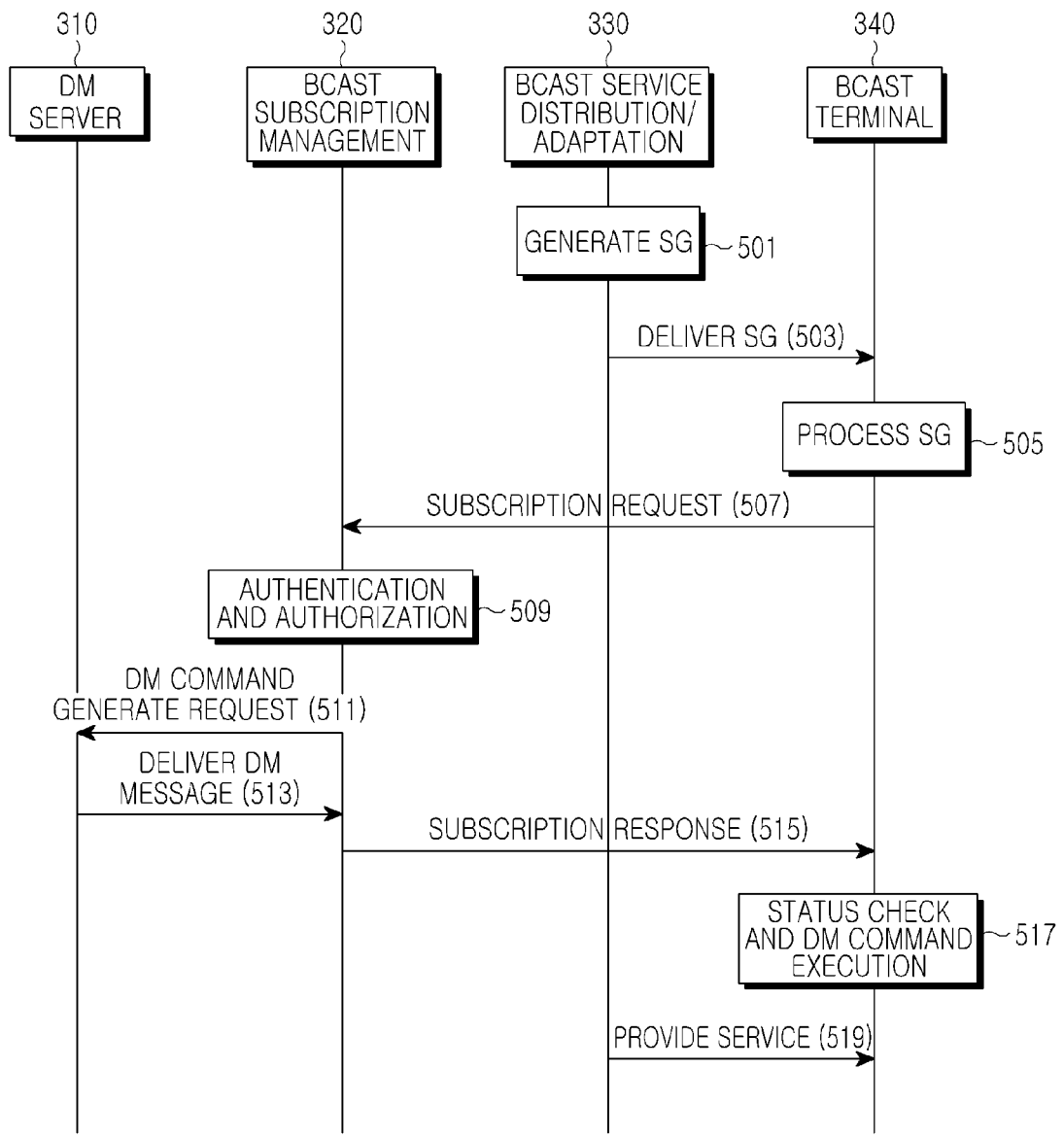
FIG. 6 illustrates a remote management process according to a second embodiment of the present invention.

FIG. 6 illustrates a remote management process according to a second embodiment of the present invention.

Figure 5:
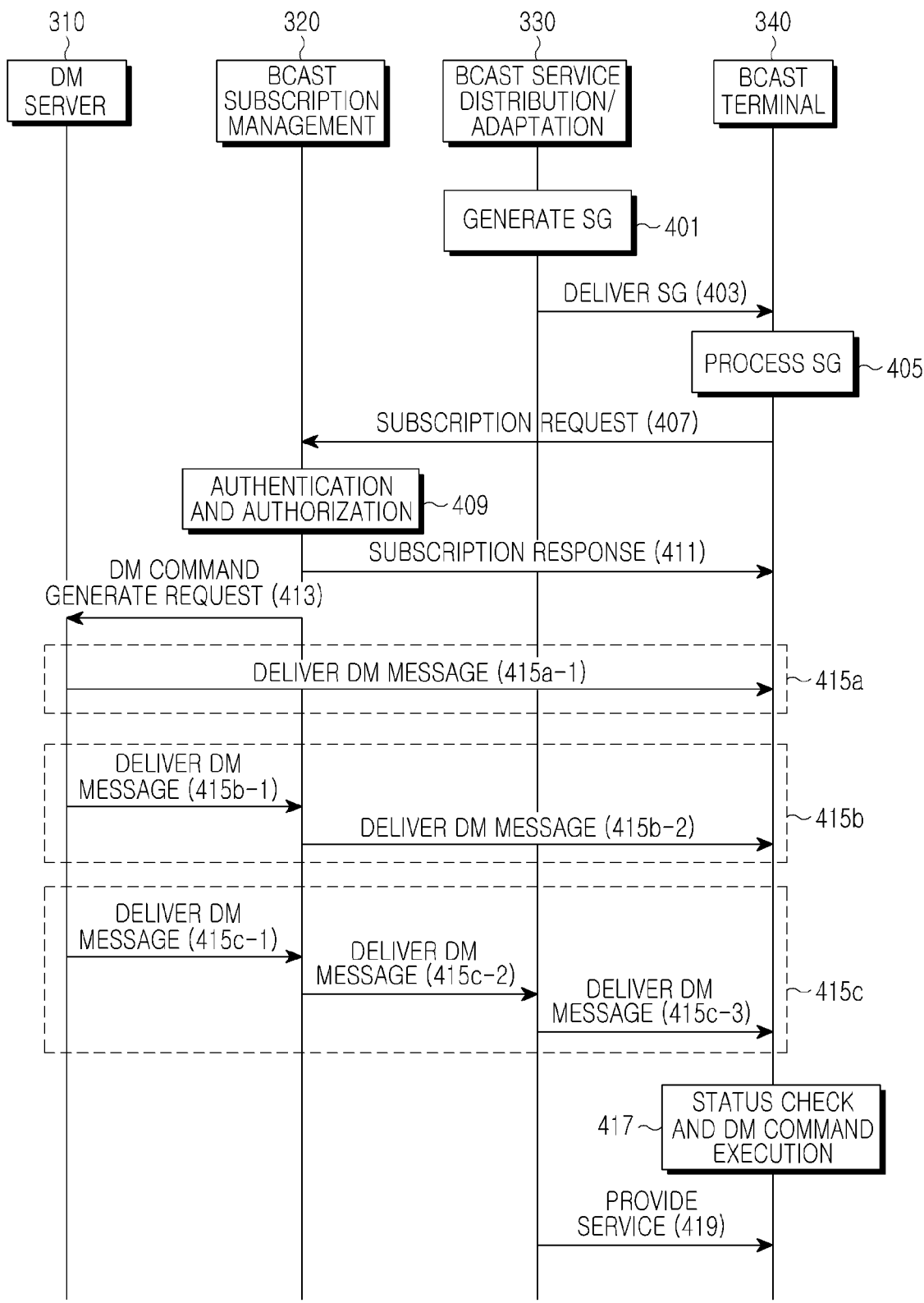
FIG. 5 illustrates a remote management process according to a first embodiment of the present invention.

Steps 501 to 509 are equal to the process of steps 401 to 409 in FIG. 5, and thus a description thereof will be omitted for the sake of conciseness.

In step 511, the BCAST Subscription Management 320 sends a request for generation of a DM command corresponding to the terminal function and management operation to be controlled, to the DM server 310. For example, the BCAST Subscription Management 320 may request generation of a DM command to restrict a particular function of the terminal. Also, the BCAST Subscription Management 320 may request generation of a DM command to change an operation mode, such as changing a bell mode to a vibration mode regarding a call alert of the terminal. Alternatively, the BCAST Subscription Management 320 may request generation of a DM command related to software update or firmware update for a certain terminal function.

In step 513, the DM server 310 generates a DM command corresponding to the requested terminal function and management operation, and delivers the DM command to the BCAST Subscription Management 320. That is, the DM server 310 may generate and deliver a DM command to restrict a particular function of the terminal.

In step 515, the BCAST Subscription Management 320 sends a subscription response message to the service subscription request received in step 507, to the first BCAST terminal 340, the subscription response message including the DM command received in step 513.

Table 4 below shows an example of a subscription response message including a DM command. The subscription response message defined in Table 4 is generated when a certain terminal function is restricted in a particular location.

TABLE 4

| Name | Type | Category | Cardinality | Description | Data Type |
|---|---|---|---|---|---|
| ServiceResponse | E | | | Service Response Message Contains the following attributes: requestID globalStatusCode adaptationMode Contains the following elements: PurchaseItem DrmProfileSpecificPart DMCommand | |
| requestID | A | O | 0 . . . 1 | Identifier for the corresponding Service request message. | unsignedInt |
| globalStatusCode | A | O | 0 . . . 1 | The overall outcome of the request, according to the return codes defined in section 5.11. If this attribute is present and set to value "0", the request was completed successfully. In this case the 'itemwiseStatusCode' SHALL NOT be given per each requested 'PurchaseItem'. If this attribute is present and set to some other value than "0", there was a generic error concerning the entire request. In this case the 'itemwiseStatusCode' SHALL NOT be given per each requested PurchaseItem'. If this attribute is not present, there was an error concerning one or more 'PurchaseItem' elements associated with the request. Further, the 'itemwiseStatusCode' SHALL be | unsignedByte |

TABLE 4-continued

| Name | Type | Category | Cardinality | Description | Data Type |
|---|---|---|---|---|---|
| adaptationMode | A | O | 0...1 | given per each requested 'PurchaseItem'. Informs the terminal of the operationl adaptation mode: Generic or BDS-specific adaptation false-indicates Generic adaptation mode true-indicates BDS-specific adaptation mode Note: this attribute SHALL be present only if the 'globalStatusCode' indicates "Success", and the underlying BDS is BCMCS. | boolean |
| PurchaseItem | E1 | M | 1...N | Describes the results of the request Message of subscribing to or purchasing the PurchaseItem. For the DRM Profile. If subscription or purchase is successful, rightsValidityEndTime of PurchaseItem will be present. For either the DRM Profile or Smartcard Profile, in the case of subscription/purchase failure, item WiseStatusCode will be present to indicate the reason why the request is not accepted by BSM. Contains the following attributes: globalDRef itemwiseStatusCode | |
| globalIDRef | A | M | 1 | The ID of the Purchase Item. A purchase item is identified by the GlobalPurchaseItemID found-in the PurchaseItem fragment. | anyURI |
| itemwise StatusCode | A | O | 0...1 | Specifies a status code if each PurchaseItems using GlobalStatusCode defined in the section 5.11. | unsignedByte |
| SubscriptionWindow | E2 | O | 0...1 | The time interval during which the subscription is valid. The network SHOULD include this element for time-based subscriptions and MAY include it for pay-per-view. The terminal MAY use this information to determine the validity period of a subscription. Contains the following attributes: startTime endTime | |
| startTime | A | M | 1 | NTP timestamp expressing the start of subsription. | unsignedInt |
| endTime | A | O | 0...1 | NTP timestamp expressing the end of subscription. This attribute SHALL NOT be present for open-ended subscriptions. | unsignedInt |
| DrmProfileSpecificPart | E1 | O | 0...1 | Service & Content Protection DRM-profile specific part. This part is MANDATORY to support for DRM Profile, and is not applicable to the Smartcard Profile. Contains the following attributes: rightsValidityEndTime Contains the following elements: roap Trigger | |
| rightsValidity EndTime | A | O | 0...1 | The last time and date of validity of the Long-Term Key Message, after which it has to be renewed. This attribute will be present when BSM accept the request message. This field is expressed as the first 32 bitsinteger part of NTP time stamps. Note: this element is validated if RO is broadcasted. Otherwise, this element is not necessary. | unsignedInt |
| roap Trigger | E2 | O | 0...1 | ROAP RO Acquisition Trigger**. The device is expected to use the trigger to initiate one or more Long- | reference to "roapTrigger" element as |

TABLE 4-continued

| Name | Type | Category | Cardinality | Description | Data Type |
| --- | --- | --- | --- | --- | --- |
| | | | | Term Key Message acquisitions. | defined in OMA DRM 2.0 XML namespace |
| SmartcardProfile SpecificPart | E1 | O | 0 . . . 1 | Service & Content Protection Smartcard-profile specific part. This part is MANDATORY to support for Smartcard Profile, and is not applicable to the DRM Profile. Contains the following elements: LTKM | |
| LTKM | E2 | O | 0 . . . N | Smartcard profile BCAST LTKM (base64-encoded MIKEY message). This element is present if the terminal and the BSM have agreed on "HTTP" as a LTKM delivery mechanism during the registration procedure (see section 5.1.6.10) | base64Binary |
| DMCommand | E1 | NO/TM | 0 . . . 1 | DM command message for use with location based capability restriction | |
| Command | E2 | NM/TM | 1 | DM command message. | complexType |

Referring to Table 4, the items newly added to include the DM command are "DMCommand" and "Command". "DMCommand" includes terminal function management condition information, and "command" includes an actual DM command.

The first BCAST terminal 340 receives the DM command in step 515. In step 517, if a triggering event satisfying restriction of a terminal function designated by the service provider during service subscription occurs after a lapse of a predetermined time, or if a status of the first BCAST terminal 340 satisfies a terminal function management condition, the DM client 341 in the first BCAST terminal 340 executes the received DM command.

For example, if a particular area corresponding to a cinema is set as a terminal function management condition in the first BCAST terminal 340 and a DM command corresponding to the terminal function management condition is to set an operation mode of a certain function, for example, to set its alert mode to a vibration mode, then the first BCAST terminal 340 sets the alert mode to the vibration mode if the first BCAST terminal 340 is located in the cinema.

Accordingly, even though multiple BCAST terminals satisfy the terminal function management condition at different timings, they can execute the same DM action.

Thereafter, in step 519, the BCAST Service Distribution/Adaptation 330 provides the service to the first BCAST terminal 340.

As is apparent from the foregoing description, a DM command to control functions of multiple wireless communication terminals that have subscribed to a particular service according to an associated service policy is delivered through a broadcasting transport, so that the present invention can simply deliver a DM command with a terminal function restriction reflected in it to the multiple terminals, thereby preventing waste of wireless resources. Also, even though the multiple wireless communication terminals have entered a service area satisfying a condition of the service policy at different timings, they can execute the same DM action.

While the invention has been shown and described with reference to certain embodiments thereof, it will be understood by those skilled in the art that various changes in form and details may be made therein without departing from the spirit and scope of the invention as defined by the appended claims and their equivalents.

For example, while the BCAST terminals are considered by way of example, the present invention may be similarly applied to terminals supporting other mobile broadcast services. Thus, a DM command message may be delivered to the terminals after being converted into a message format for the related mobile broadcast service. Although it has been described that the BCAST Service Distribution/Adaptation 330 and the BCAST Subscription Management 320 are independent components, the BCAST Service Distribution/Adaptation 330 and the BCAST Subscription Management 320 may be included in a BCAST broadcasting server or a mobile broadcast service broadcasting server in alternative embodiments of the present invention.

In addition, while it has been described in the foregoing embodiments that a transmission timing of the terminal function management condition, a generation request timing of the DM command, and a delivery timing of the DM command are determined in association with the time that the BCAST terminal subscribes to the service the transmission timing of the terminal function management condition, the generation request timing of the DM command, and the delivery timing of the DM command may be determined according to various parameters generated during service providing and/or to the need of the service provider.

What is claimed is:
1. A terminal for supporting a mobile broadcast service, comprising:
 a broadcast service processing module configured to:
  receive a service guide including a terminal function management condition from a first server, and
  send a service subscription request to a second server; and
 a Device Management (DM) client configured to:
  receive at least one message including a DM command generated by a DM server,
  store the DM command,
  determine whether a status of the terminal satisfies the terminal function management condition, and
  if the status of the terminal satisfies the terminal function management condition, execute the DM command,
 wherein the at least one message comprises a first message, a second message, and a third message, wherein the at least one terminal receives one or more messages among the first message, the second message, and the third message, and wherein the first message is transmitted to all terminal, including the at least one terminal, that have sent the service subscription request, the second message is transmitted to a first terminal that has been authenticated in response to the service subscription request, and the third message is transmitted to a second terminal that has been grouped as the same service group.

2. The terminal of claim 1, wherein the terminal function management condition is included in at least one of a service fragment and a content fragment of the service guide.

3. The terminal of claim 1, wherein the at least one message including the DM command is directly received from the DM server.

4. The terminal of claim 1, wherein the DM client receives the at least one message including the DM command, as the second server receives the DM command from the DM server, reformats the DM command into a mobile broadcast service message, and delivers the reformatted mobile broadcast service message to all terminals that have sent the service subscription request, including the terminal.

5. The terminal of claim 1, wherein the mobile broadcast service is a Mobile Broadcast Working Group (BCAST) service, the first server includes a BCAST Service Distribution/Adaptation, the second server includes a BCAST Subscription Management, and the terminal is a BCAST terminal.

6. The terminal of claim 5, wherein the DM client receives the at least one message including the DM command, as the BCAST Subscription Management receives the DM command from the DM server, reformats the DM command into a BCAST message, and delivers the BCAST message to all of the terminals that have sent the service subscription request, including the terminal.

7. The terminal of claim 6, wherein the BCAST Subscription Management delivers the reformatted BCAST message through the BCAST Service Distribution/Adaptation.

8. The terminal of claim 7, wherein the BCAST message is generated by at least one of Open Mobile Alliance (OMA) Push and BCAST Notification.

9. The terminal of claim 1, wherein the at least one message including the DM command is sent by the second server in response to the service subscription request.

10. The terminal of claim 1, wherein, if the terminal function management condition is the particular location of the terminal, the DM command restricts a particular terminal function.

11. The terminal of claim 1, wherein the DM command is associated with a software update or a firmware update for a particular terminal function.

12. The terminal of claim 1, wherein the at least one message is transmitted from the DM server directly to the terminal, from the DM server to the terminal through a second server, or from the DM server to the terminal through a first server and the second server, based on a type of the at least one message.

13. A method for supporting a mobile broadcast service at a terminal, comprising:

receiving a service guide including a terminal function management condition from a first server;

sending a service subscription request to a second server;

receiving at least one message including a Device Management (DM) command generated by a DM server;

determining whether a status of the terminal satisfies the terminal function management condition; and executing the DM command if the status of the terminal satisfies the terminal function management condition, wherein the at least one message comprises a first message, a second message, and a third message, wherein the at least one terminal receives one or more messages among the first message, the second message, and the third message, and wherein the first message is transmitted to all terminals, including the at least one terminal, that have sent the service subscription request, the second message is transmitted to a first terminal that has been authenticated in response to the service subscription request, and the third message is transmitted to a second terminal that has been grouped as a same service group.

14. The method of claim 13, wherein the terminal function management condition is included in at least one of a service fragment and a content fragment of the service guide.

15. The method of claim 13, wherein the at least one message including the DM command is directly received from the DM server.

16. The method of claim 13, wherein the terminal receives the at least one message including the DM command, as the second server receives the DM command from the DM server, reformats the DM command into a mobile broadcast service message, and delivers the reformatted mobile broadcast service message to all terminals that have sent the service subscription request, including the terminal.

17. The method of claim 13, wherein the mobile broadcast service is a Mobile Broadcast Working Group (BCAST) service, the first sever includes a BCAST Service Distribution/Adaptation, the second server includes a BCAST Subscription Management, and the terminal is a BCAST terminal.

18. The method of claim 17, wherein the terminal receives the at least one message including the DM command, as the BCAST Subscription Management receives the DM command from the DM server, reformats the DM command into a BCAST message, and delivers the BCAST message to all of the terminals that have sent the service subscription request, including the terminal.

19. The method of claim 18, wherein the BCAST Subscription Management delivers the reformatted BCAST message through the BCAST Service Distribution/Adaptation.

20. The method of claim 19, wherein the BCAST message is generated by at least one of Open Mobile Alliance (OMA) Push and BCAST Notification.

21. The method of claim 13, wherein the at least one message including the DM command is sent by the second server in response to the service subscription request.

22. The method of claim 13, wherein the at least one message is transmitted from the DM server directly to the terminal, from the DM server to the terminal through a second server, or from the DM server to the terminal through a first server and the second server, based on a type of the at least one message.

* * * * *